US010402187B2

(12) United States Patent
Turovsky et al.

(10) Patent No.: US 10,402,187 B2
(45) Date of Patent: Sep. 3, 2019

(54) EFFICIENT WORKLOAD DEPLOYMENT USING CONTAINERS AND UNIKERNELS

(71) Applicant: Jisto Inc., Boston, MA (US)

(72) Inventors: Andrey Turovsky, Wynantskill, NY (US); Aleksandr Biberman, Arlington, MA (US)

(73) Assignee: Trilio Data Inc., Hopkinton, MA (US)

( * ) Notice: Subject to any disclaimer, the term of this patent is extended or adjusted under 35 U.S.C. 154(b) by 62 days.

(21) Appl. No.: 15/662,649

(22) Filed: Jul. 28, 2017

(65) Prior Publication Data

US 2018/0046446 A1    Feb. 15, 2018

Related U.S. Application Data

(60) Provisional application No. 62/373,147, filed on Aug. 10, 2016.

(51) Int. Cl.
    *G06F 8/61*           (2018.01)
    *G06F 8/65*           (2018.01)
    (Continued)

(52) U.S. Cl.
    CPC ............... *G06F 8/65* (2013.01); *G06F 8/71* (2013.01); *G06F 9/455* (2013.01); *G06F 8/63* (2013.01); *G06F 9/44521* (2013.01)

(58) Field of Classification Search
    CPC ..... G06F 8/65; G06F 8/63; G06F 8/71; G06F 9/455; G06F 9/44521
    (Continued)

(56) References Cited

U.S. PATENT DOCUMENTS

| 7,568,195 B2 * | 7/2009 | Markley ............ G06F 8/65 717/170 |
| 8,707,294 B2 * | 4/2014 | Bajaj ............ G06F 9/44563 717/175 |

(Continued)

OTHER PUBLICATIONS

Inagaki et al., "Container Management as Emerging Workload for Operating Systems", 2016, IEEE (Year: 2016).*

(Continued)

*Primary Examiner* — Wei Y Zhen
*Assistant Examiner* — Junchun Wu
(74) *Attorney, Agent, or Firm* — Goodwin Procter LLP (57) ABSTRACT

A bottom-up approach is taken to creating a condensed container, in which an automatic determination is made of the minimum set of requirements and dependencies, in forms of libraries and packages, for deployed applications/services and any corresponding user-specified content. The most fitting libraries and packages are merged with the applications/services, and the merged results are containerized using a minimized version of a container base image. Specialized unikernel generation includes automatically determining the minimum set of requirements and dependencies, in forms of libraries and packages, for the deployed applications/services and any corresponding user-specified content. The best available library operating system is identified, and compilation occurs to generate the unikernel. In effect, optimized (in terms of most fitting to applications/services, for any combination of size, speed, resource utilization, and performance) containers and unikernel images from applications/services by leveraging traditional unikernel technologies are produced.

16 Claims, 5 Drawing Sheets

(51) Int. Cl.
*G06F 8/71* (2018.01)
*G06F 9/445* (2018.01)
*G06F 9/455* (2018.01)

(58) Field of Classification Search
USPC .......................................................... 717/169
See application file for complete search history.

(56) References Cited

U.S. PATENT DOCUMENTS

| | | | | |
|---|---|---|---|---|
| 8,832,681 | B1* | 9/2014 | Cantrell | G06F 8/61 |
| | | | | 717/172 |
| 9,210,141 | B2* | 12/2015 | Anderson | H04L 9/3213 |
| 9,886,303 | B2* | 2/2018 | Koller Jemio | G06F 8/54 |
| 9,916,233 | B1* | 3/2018 | Qureshi | G06F 11/3692 |
| 9,928,059 | B1* | 3/2018 | Sartor | G06F 8/71 |
| 10,007,509 | B1* | 6/2018 | Qureshi | H04L 67/34 |
| 2006/0230395 | A1* | 10/2006 | Paul | G06F 8/65 |
| | | | | 717/173 |
| 2006/0277537 | A1* | 12/2006 | Chan | G06F 8/65 |
| | | | | 717/168 |
| 2008/0127154 | A1* | 5/2008 | Drepper | G06F 8/443 |
| | | | | 717/162 |
| 2009/0070752 | A1* | 3/2009 | Alpern | G06F 8/443 |
| | | | | 717/148 |
| 2010/0107151 | A1* | 4/2010 | Thirumalai | G06F 8/63 |
| | | | | 717/174 |
| 2011/0265081 | A1* | 10/2011 | Lucovsky | G06F 8/60 |
| | | | | 717/177 |
| 2011/0265164 | A1* | 10/2011 | Lucovsky | G06F 9/45533 |
| | | | | 717/175 |
| 2014/0215452 | A1* | 7/2014 | Hicks | G06F 8/656 |
| | | | | 717/172 |
| 2016/0147529 | A1* | 5/2016 | Coleman | G06F 8/63 |
| | | | | 717/120 |
| 2017/0364377 | A1* | 12/2017 | Koller Jemio | G06F 8/54 |
| 2017/0364794 | A1* | 12/2017 | Mahkonen | G06N 3/08 |
| 2018/0025160 | A1* | 1/2018 | Hwang | G06F 21/577 |
| | | | | 726/25 |
| 2018/0074852 | A1* | 3/2018 | Bishop | G06F 9/4881 |

OTHER PUBLICATIONS

Yi et al., "Design and Implementation of the Container Terminal Operating System Based on Service-Oriented Architecture", 2008, IEEE (Year: 2008).*

Balogh et al., "Model-Based Optimization of Enterprise Application and Service Deployment", 2005, Springer-Verlag Berlin Heidelberg (Year: 2005).*

Kivity et al., "Optimizing the Operating System for Virtual Machines", Jun. 2014, USENIX (Year: 2014).*

Milanovic et al., "Service-Oriented Operating System: A Key Element in Improving Service Availability", 2007, Springer-Verlag Berlin Heidelberg (Year: 2007).*

Madhavapeddy et al., "Unikernels: Rise of the Virtual Library Operating System", Nov. 2013, ACM Queue, vol. 11 Issue 11 (Year: 2013).*

* cited by examiner

Ubuntu β — 301

All Available Libraries and Packages — 204

| Shared Libraries — 206 | Packages — 207 |
|---|---|
| libexampleA.so.3 | libexampleA3.deb |
| libexampleB.so.0 | libexampleB0.deb |
| libexampleC.so.8 | libexampleC8.deb |
| .... | .... |

All Library and Package Dependencies and Sub-Dependencies from User Specification — 210

SSH (Secure Shell) Support — 212

| Libraries — 213 | Packages — 214 |
|---|---|
| libexamplesD.so.5 | libexampleD5.deb |
| libexamplesE.so.2 | libexampleE2.deb |
| libexamplesF.so.5 | libexampleF5.deb |
| .... | .... |

CentOS γ — 301

All Available Libraries and Packages — 204

| Shared Libraries — 206 | Packages — 207 |
|---|---|
| libexampleA.so.2 | libexampleA2.rpm |
| libexampleB.so.0 | libexampleB0.rpm |
| libexampleC.so.8 | libexampleC8.rpm |
| .... | .... |

All Library and Package Dependencies and Sub-Dependencies from User Specification — 210

SSH (Secure Shell) Support — 212

| Libraries — 213 | Packages — 214 |
|---|---|
| libexamplesD.so.5 | libexampleD5.rpm |
| libexamplesE.so.1 | libexampleE1.rpm |
| libexamplesF.so.5 | libexampleF5.rpm |
| .... | .... |

300 — Example Repository Lists of Libraries and Packages for Various Example Operating Systems

FIG. 3 (Cont.)

EFFICIENT WORKLOAD DEPLOYMENT USING CONTAINERS AND UNIKERNELS

CROSS-REFERENCE TO RELATED APPLICATION

This application claims priority to and the benefit of U.S. Provisional Patent Application No. 62/373,147, filed on Aug. 10, 2016, and entitled "Efficient Workload Deployment Using Containers and Unikernels," the entirety of which is incorporated by reference herein.

TECHNICAL FIELD

This disclosure is directed generally to containerization and unikernel generation, and, more particularly, to a bottom-up approach for forming condensed containers and unikernels that minimize overhead and enhance performance and resource utilization.

BACKGROUND

Containers enable application/service deployment environments with relatively-low overhead compared with other virtualization techniques, while offering portability, compatibility, and isolation. They leverage server virtualization methods such as operating system-level virtualization, where the kernel of an operating system allows for multiple isolated user space instances, instead of just one.

However, traditional application/service deployments using containers have employed a top-down approach, which containerizes applications/services in a container that is inclusive of many standard libraries, packages, and binaries of an operating system (OS). These comprise many of the possible requirements and dependencies for this application/service, many of which will not be used during regular operation of the application/service, but are still included in the container. Even though the container allows for relatively-low overhead by leveraging a shared kernel between containers on the same host, that overhead is still relatively high compared to the minimum set of requirements and dependencies of the application/service during regular operation.

Unikernels consist of single address space machine images, and may be constructed with the use of library operating systems (OS). Traditionally, to deploy applications/services as unikernels, the developers would manually identify the minimum set of libraries corresponding to the operation system (OS) constructs for specific types of unikernels. These libraries would then be compiled with the applications/services and any corresponding configuration code. Many times, device drivers would also be required for specific hardware on which the unikernel is to be deployed, as well as protocol libraries.

Compared with deploying applications/services using traditional operating systems, deploying applications/services using unikernels offers several benefits, which include small footprint, short boot times, and increased security. However, because of their high degree of specialization, combined with their inability to allow developers to debug or modify them after compilation, unikernels are unsuitable for general-purpose, multi-user computing, an area where traditional operating systems excel.

SUMMARY OF THE INVENTION

The present disclosure describes, in various implementations, systems and methods for efficient workload deployment using containers and unikernels. One implementation of condensed containerization, a bottom-up approach, includes a system that first automatically determines the minimum set of requirements and dependencies, in forms of libraries and packages, for deployed applications/services and any corresponding user-specified content. This system determines which versions of libraries and packages are most fitting by comparing lists corresponding to compatible operating systems, merges them with the applications/services, and performs the containerization of the merged results using a minimized version of a container base image. This minimized version of a container base image, which sometimes may be referred to as a "scratch" container, acts as a minimal starting point for building containers. Thus, the system produces optimized (in terms of size, speed, resource utilization, and performance) container images from applications/services by leveraging traditional containerization technologies.

One implementation of specialized unikernel generation includes a system that first automatically determines the minimum set of requirements and dependencies, in forms of libraries and packages, for the deployed applications/services and any corresponding user-specified content. This system then matches the best available library operating system, and performs the compilation to generate the unikernel. Thus, this system produces optimized (in terms of most fitting to applications/services, for any combination of size, speed, resource utilization, and performance) unikernel images from applications/services by leveraging traditional unikernel technologies.

Furthermore, for systems leveraging both deployment packages of condensed containerization and specialized unikernel generation, part of this disclosure describes a method that automatically selects the best deployment packages for which to deploy the applications/services at any given time. This selection may be based on application/service type, size, granularity, duration, estimated execution time, coupling, modularity, technical fit, user-specified content, resource availability, resource utilization metrics, historical data, including the use of machine learning, specifications for any licensed software, security boundaries in the network and/or organization, as well as device driver and protocol library availabilities. Based on these decision points, there is also a path in the system for bypassing the deployment packages, which may also be used for debugging purposes.

Accordingly, in one aspect, a method for creating a condensed container includes receiving an instruction to create a container that includes one or more applications and services, and identifying one or more shared libraries and corresponding packages required for executing applications and services. An optimal operating system for the container is determined, and versions of the shared libraries and the corresponding packages that correspond to the optimal operating system are selected. A container is then created based on a merge formed of the selected versions of the shared libraries and corresponding packages with the applications and services. Other aspects of the foregoing method include corresponding systems and non-transitory computer-readable media.

In one implementation, one or more user-selected libraries and corresponding packages are identified based on functionality specified by a user for inclusion in the container. Versions of these user-selected libraries and corresponding packages that correspond to the optimal operating system are selected and included in the container.

Other implementations include one or more of the following features. A user interface that allows the user to select functionality for inclusion in the container can be provided. The optimal operating system for the container can be determined by identifying one or more operating systems that support each of the applications and services. The container can be created by containerizing the merge using a minimized container based image. The container can be deployed to one or more servers.

In a further implementation, a deployment package is selected from a plurality of deployment packages to deploy one or more applications and services, based on at least one factor associated with the applications and services, specified user content, deployment resources, historical data, licensed software specifications, organization or network security boundaries, or driver or protocol library availability. The applications and services are then deployed using the selected deployment package. Factors associated with the applications and services can include type, size, granularity, duration, estimated execution time, coupling, modularity, and technical fit between each application or service and available deployment packages. Factors associated with the deployment resources can include server cluster resource availability and resource utilization metrics.

In another aspect, a method for creating a unikernel includes identifying one or more requirements or dependencies required for executing one or more deployed applications and services, and identifying a library operating system to use for the deployed applications and services. The deployed applications and services and the library operating system are compiled into a unikernel. In some implementations, a container is created based on the unikernel. Other aspects of the foregoing method include corresponding systems and non-transitory computer-readable media.

BRIEF DESCRIPTION OF THE DRAWINGS

Various objectives, features, and advantages of the disclosed subject matter can be more fully appreciated with reference to the following detailed description of the disclosed subject matter when considered in connection with the following drawings, in which like reference numerals identify like elements.

DETAILED DESCRIPTION OF THE INVENTION

Figure 1:
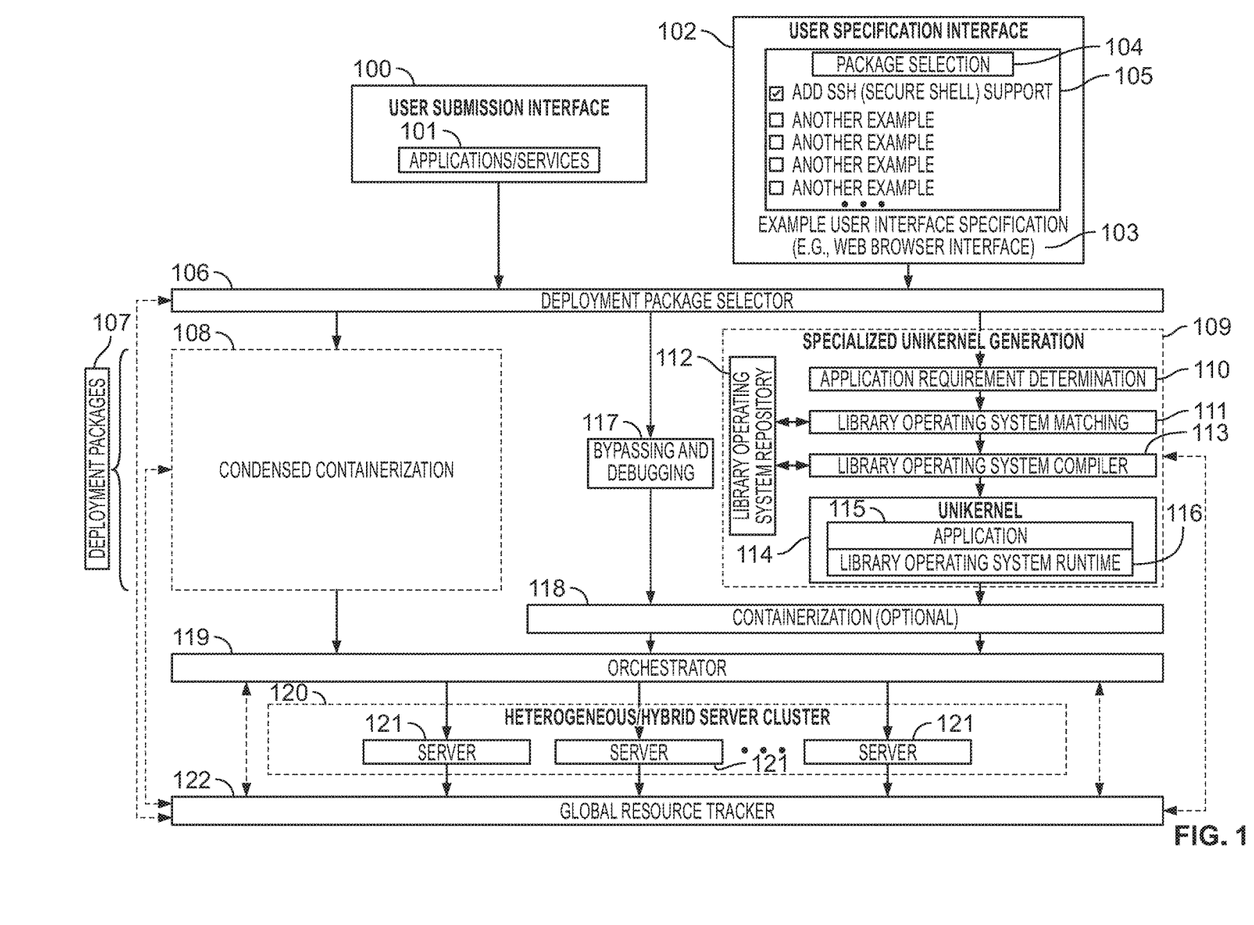
FIG. 1 is an exemplary Architecture for Efficient Workload Deployment Using Containers and Unikernels.

Referring to FIG. 1, an exemplary embodiment of the Architecture for Efficient Workload Deployment Using Containers and Unikernels concept is illustrated and include the following elements.

User Submission Interface [100] is an interface that a user may use to interface with the system. For example, the user may submit Applications/Services [101] to the Deployment Package Selector [106] through the User Submission Interface [100]. This may be accomplished, for example, manually or automatically, through a command-line interface (CLI), graphical user interface (GUI), application program interface (API), web browser interface, or any combination thereof.

Applications/Services [101] are software functionalities that can be reused for different purposes, and may also be coupled with policies that control their usage. For example, in an enterprise setting, Applications/Services [101] may be defined through enterprise architecture (EA) practices for organizing business processes and information technology (IT) infrastructure. Different enterprises may have different types of Applications/Services [101] with various application granularities, which are often also correlated with their size and duration. Applications/Services [101] that may be deployed in any state, including (but not limited to) as any combination of source code, binaries, functional elements, build instructions, container images, virtual machine (VM) images, or unikernel images. Applications/Services [101] may run in architectures that include, for example, any combination of:

a) Monolithic applications, which may be single-tiered software applications in which, for example, the user interface and data access code are combined into a single program from a single platform.
b) Services, which may follow service-orientation and service-oriented-architecture (SOA) design principles, and multitier (e.g., three-tier) architecture.
c) Microservices, which may support complex applications composed of many small, independent processes communicating with each other.
d) "Serverless" architectures (or other architectures based functional programming), which tends to abstract the underlying resources from the Applications/Services [101] developers, and are typically more focused on the completion and duration of each event, independent of those underlying resources.

User Specification Interface [102] is an interface that the user may use to interface with the system. For example, the user may select which packages they want to be included with the Applications/Services [101] through the User Specification Interface [102]. This may be accomplished, for example, manually or automatically, through a command-line interface (CLI), graphical user interface (GUI), application program interface (API), web browser interface, or any combination thereof. Some content in the User Specification Interface [102] may not require user engagement in order for the Applications/Services [101] to be deployed, and other content may require user engagement.

Example User Specification Interface (e.g. Web Browser Interface) [103], is one example instantiation of the User Specification Interface [102]. This example includes the Package Selection [104], which has an example list of packages for the user, with corresponding checkboxes the user can check, selecting, in this example, which packages are to be included with the Application/Service [101] deployments.

Add SSH (Secure Shell) Support [105] is an example checkbox the user may check to select the corresponding package to be deployed with the Applications/Services [101], as described in the Example User Specification Interface (e.g. Web Browser Interface) [103] example above.

Deployment Package Selector [106] keeps track of all the Applications/Services [101] and any User Specification Interface [102] content that the user submits, and selects the best Deployment Packages [107] for which to deploy them at any given time. The decision of which Deployment Packages [107] to deploy with may be based on any combination of (a) Application/Service [101] type, size, granularity, duration, estimated execution time, coupling, modularity; (b) technical fit between each Applications/Services [101] and Deployment Packages [107]; (c) User Specification Interface [102] content and any corresponding user specification; (d) resource availability in the Heterogeneous/Hybrid Server Cluster [120]; (e) resource utilization metrics gathered by the Global Resource Tracker [122]; (f) historical data, including the use of machine learning; (g) specifications for any licensed software; (h) security boundaries in the network and/or organization; (i) device driver and protocol library availabilities.

Bypassing and Debugging [117] is a path that the Deployment Package Selector [106] may also choose for the submitted Applications/Services [101] and any corresponding User Specification Interface [102] content from user specification to bypass the Deployment Packages [107], based on these same aforementioned decision points. This Bypassing and Debugging [117] path may also be used for debugging purposes, deploying the same Applications/Services [101] through the Bypassing and Debugging [117] path that were deployed through Deployment Packages [107].

Figure 2:
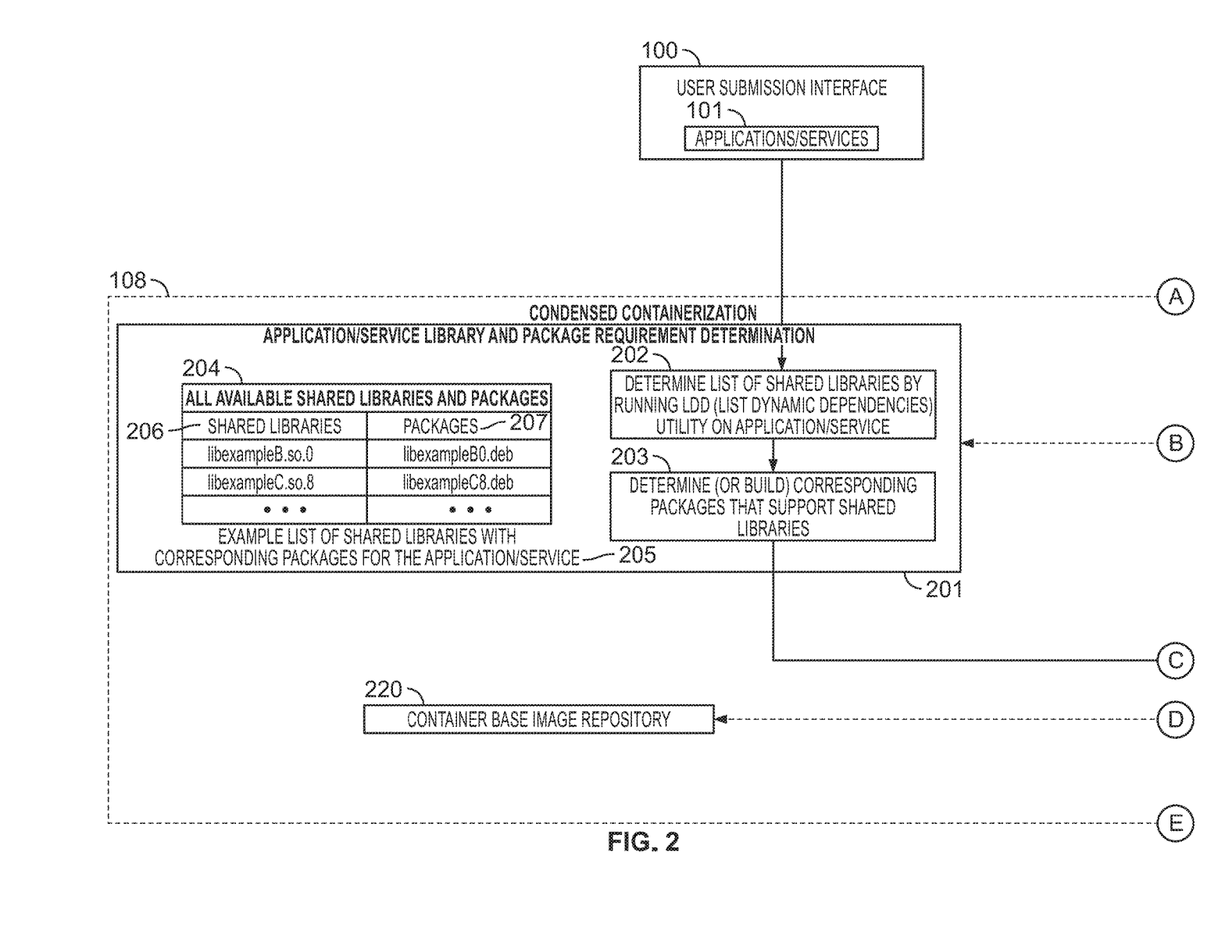
FIG. 2 is an exemplary Architecture for Condensed Containerization.

Condensed Containerization [108], which is described in detail in FIG. 2, is a Deployment Package [107]. Condensed Containerization [108], a unique process that is part of this invention, is able to produce optimized (in terms of size, speed, resource utilization, and performance) container images from Applications/Services [101] by leveraging traditional containerization technologies.

Traditional container technologies, which are depicted by Containerization (Optional) [118] in FIG. 1 and Containerize Application and Libraries/Packages Using Scratch Container Image from Container Base Image Repository [219] in FIG. 2, may leverage server virtualization methods such as operating system (OS)-level virtualization, where the kernel of an operating system (OS) allows for multiple isolated user space instances, instead of just one. Some instances of this may include, but are not limited to, containers, virtualization engines (VEs), virtual private servers (VPS), jails, or zones, and/or any hybrid combination thereof. Some example available technologies for this containerization include chroot, Docker, Linux-VServer, lmctfy ("let me contain that for you"), LXC (Linux containers), Canonical LXD, OpenVZ (Open Virtuozzo), Parallels Virtuozzo Containers, Solaris Containers (and Solaris Zones), FreeBSD Jail, sysjail, WPARs (workload partitions), HP-UX Containers (SRP, secure resource partitions), iCore Virtual Accounts, Sandboxie, Spoon, and VMware ThinApp.

Specialized Unikernel Generation [109] is a Deployment Package [107]. Specialized Unikernel Generation [109], a unique process that is part of this invention, is able to produce optimized (in terms of most fitting to Applications/Services [101], for any combination of size, speed, resource utilization, and performance) unikernel images from Applications/Services [101] by leveraging traditional unikernel technologies.

Traditional unikernel technologies, which are depicted by Unikernel [114] in FIG. 1, may consist of single address space machine images, and may be constructed with the use of library operating systems (OS). Some example available technologies for this unikernel include ClickOS, Clive, Drawbridge, Graphene, HaLVM (Haskell Lightweight Virtual Machine), IncludeOS, LING, MirageOS, OSv, Rumprun, and runtime.js.

Traditionally, to deploy Applications/Services [101] as unikernels, the developers of those Applications/Services [101] would manually identify the minimum set of libraries corresponding to the operation system (OS) constructs for specific types of unikernels. These libraries would then be compiled with the Applications/Services [101] and any corresponding configuration code. Many times, device drivers would also be required for specific hardware on which the unikernel is to be deployed, as well as protocol libraries.

Application Requirement Determination [110] is a step in the Specialized Unikernel Generation [109] that determines the various requirements and dependencies for deployed Applications/Services [101] and any corresponding User Specification Interface [102] content. For example, this may be determining required and user-specified libraries and packages, similar to Application/Service Library and Package Requirement Determination [201] and User Specification Application/Service Library and Package Requirement Determination [208], both depicted in FIG. 2, respectively. Application Requirement Determination [110] may also determine which programming language(s) and software framework(s) are required. For Applications/Services [101] that are deployed as source code, the Application Requirement Determination [110] may also build the Applications/Services [101] into binaries to gather some or all of these requirements.

Library Operating System Matching [111], which determines which available library operating system is best suited for the deployed Applications/Services [101]. The selection factors may be taken from the requirements gathered from the Application Requirement Determination [110], and may also be combined with other factors such as resource utilization metrics gathered by the Global Resource Tracker [122] and User Specification Interface [102] content, matching the deployed Applications/Services [101] with available library operating systems in the Library Operating System Repository [112].

Library Operating System Repository [112] is the repository where the available library operating systems are stored.

Library Operating System Compiler [113] is a compiler that converts the deployed Applications/Services [101] into the Unikernel [114], using the library operating system selected by the Library Operating System Matching [111] from the Library Operating System Repository [112]. As part of the compilation, the Library Operating System Compiler [113] may also include specific language runtimes, any required device drivers and protocol libraries.

Application [115] and Library Operating System Runtime [116] are parts of the compiled product of the Unikernel [114]. The Application [115] is unique to each Applications/Services [101] deployment, and the Library Operating System Runtime [116] may be unique to each type of library operating system.

Orchestrator [119] may refer to the Application Management Engines (106), as part of the Elastic Compute Cloud Framework described in the utility patent application Elastic Compute Cloud Based on Underutilized Server Resources Using a Distributed Container System (U.S. patent application Ser. No. 14/640,569, filed on Mar. 6, 2015), as well as the Elastic Workload Orchestrator [107], as part of the Elastic Workload Orchestration Architecture described in the utility patent application Ubiquitous and Elastic Workload Orchestration Architecture of Hybrid Applications/Services on Hybrid Cloud (U.S. patent application Ser. No. 15/381,427, filed on Dec. 16, 2016), the entireties of which are incorporated by reference herein.

Heterogeneous/Hybrid Server Cluster [120] is a cluster that is formed from any hybrid combination of Server [121] resources, spanning, for example, on-premises data centers, private clouds, and public clouds.

Server [121], which may operate within a client-server architecture, responds to requests across a computer network to provide, or help to provide a networked service. The client or clients may run on the same physical or virtual Server [121], or may be connected to the Server [121] over a network. Some examples of Server [121] types include computing servers, application servers, database servers, web servers, file servers, mail servers, and game servers.

Global Resource Tracker [122], which keeps track of resource utilization metrics of each Server [121] in the Heterogeneous/Hybrid Server Cluster [120]. These resource utilization metrics may include, but are not limited to, capacity of its central processing unit (CPU), random-access memory (RAM), graphics processing unit (GPU), storage, network bandwidth, memory bandwidth, and central processing unit (CPU) cache. For example, resource utilization metrics may be gathered for, and differentiated between, physical servers, virtual machines (VMs), containers, unikernels, applications, and processes. These resource utilization metrics may be gathered from agents running on each Server [121], as well as with agentless approaches. Furthermore, the Global Resource Tracker [122] shares the resource utilization metrics with the (a) Deployment Package Selector [106], to assist in selecting the most fitting Deployment Package [107] for each Application/Service [101] deployment; (b) Condensed Containerization [108], for optimized container-based deployment; (c) Specialized Unikernel Generation [109], for optimized unikernel-based deployment; (d) Orchestrator [119], for selecting the most fitting Server [121] onto which to deploy in the Heterogeneous/Hybrid Server Cluster [120].

Referring to FIG. 2, an exemplary embodiment of the Architecture for Condensed Containerization [108] concept is illustrated and includes the following elements.

Figure 3:
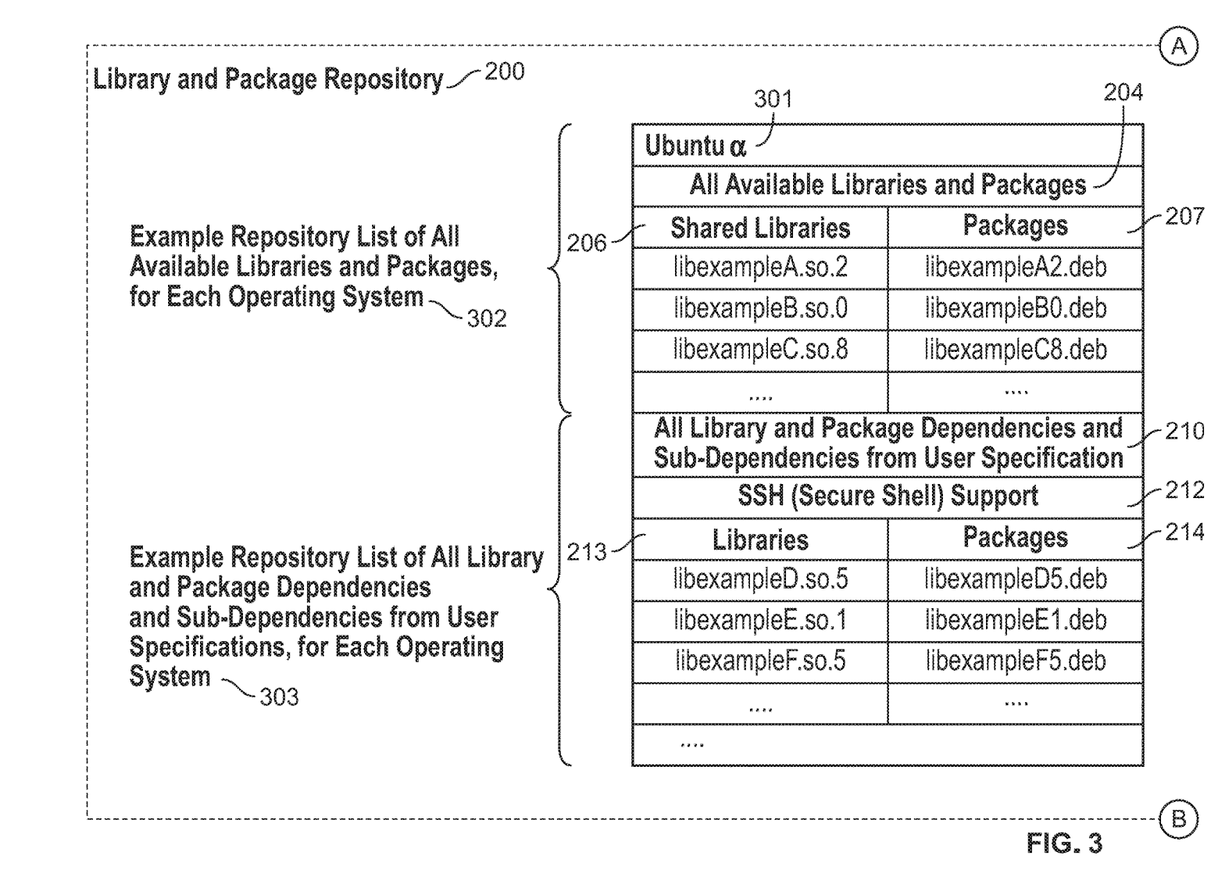
FIG. 3 is an exemplary Library and Package Repository, depicting the Example Repository Lists of Libraries and Packages for Various Example Operating Systems.

Library and Package Repository [200], as depicted in more detail in FIG. 3, may be comprised of lists corresponding to available libraries and corresponding packages, for each operating system. These lists may leverage any combination of local libraries and packages, those that that are in other designated repositories, and those that are in common public repositories. Library and Package Repository [200] assists with Application/Service Library and Package Requirement Determination [201], User Specification Application/Service Library and Package Requirement Determination [208], as well as Containerization [215].

Application/Service Library and Package Requirement Determination [201] are steps that determine all the library and corresponding package requirements based on the Applications/Services [101] deployed by the user. Application/Service Library and Package Requirement Determination [201] steps include:

a) Determine List of Shared Libraries by Running LDD (List Dynamic Dependencies) Utility on Application/Service [202], which, for example, involves running the LDD (list dynamic dependencies) Linux utility, which prints the shared objects (shared libraries) required by each Application/Service [101] or shared object. For Applications/Services [101] that are deployed as source code, the Application/Service Library and Package Requirement Determination [201] may also first build the Applications/Services [101] into binaries. Running the LDD (list dynamic dependencies) utility is an example, and may also be accomplished with a number of other utilities and tools for a number of operating systems. Determine List of Shared Libraries by Running LDD (List Dynamic Dependencies) Utility on Application/Service [202] may be assisted by the Library and Package Repository [200], for example, in providing library availability for various operating systems.

b) Determine (or Build) Corresponding Packages that Support Shared Libraries [203], which, for example, involves determining (or building) corresponding packages that support the shared libraries that are determined in the previous step of the Application/Service Library and Package Requirement Determination [201]. Determine (or Build) Corresponding Packages that Support Shared Libraries [203] may be assisted by the Library and Package Repository [200], for example, in matching libraries to packages for various operating systems.

All Available Shared Libraries and Packages [204] is an example list that illustrates, as an example, the Application/Service Library and Package Requirement Determination [201] step results. As described in FIG. 2, this is an Example List of Shared Libraries with Corresponding Packages for the Application/Service [205]. All Available Shared Libraries and Packages [204], as an example, contains lists of Shared Libraries [206], which are operating system libraries that are loaded by programs when they start, and Packages [207], which are operating system packages, for an example operating system. Similar lists may be generated for any operating system type and version, as depicted in FIG. 3 for the Library and Package Repository [200].

User Specification Application/Service Library and Package Requirement Determination [208] are steps that determine all the library and corresponding package requirements based on any User Specification Interface [102] content interfaced with by the user. User Specification Application/Service Library and Package Requirement Determination [208] steps include:

a) Translate User Specification Selection to Corresponding Libraries and Packages [209], which, for example, involves translating User Specification Interface [102] content that has interfaced with the user into corresponding Libraries [213] and Packages [214]. In one example, the user may check Add SSH (Secure Shell) Support [105] in the Package Selection [104] example of the User Specification Interface [102]. The Translate User Specification Selection to Corresponding Libraries and Packages [209] step would then translate this into appropriate Libraries [213] and Packages [214]. Translate User Specification Selection to Corresponding Libraries and Packages [209] may be assisted by the Library and Package Repository [200], for example, in matching User Specification Interface [102] content to available libraries, as well as matching libraries to Packages, for various operating systems.

Library and Package Dependencies and Sub-Dependencies from User Specification [210] is an example list that illustrates, as an example, the User Specification Application/Service Library and Package Requirement Determination [208] step results. As described in FIG. 2, this is an Example List of Libraries and Packages Corresponding to the User Specification Interface [211], which lists out SSH (Secure Shell) Support [212] based on the checked Add SSH (Secure Shell) Support [105] from the Package Selection [104] example of the User Specification Interface [102] content. Library and Package Dependencies and Sub-Dependencies from User Specification [210], as an example, contains lists of Libraries [213], which are operating system libraries, and Packages [214], which are operating system packages, for an example operating system. Similar lists may be generated for any operating system type and version, as well as for other example User Specification Interface [102] content, as depicted in FIG. 3 for the Library and Package Repository [200].

Containerization [215] are steps that are able to create the condensed container from the determined library and corresponding package requirements based on the Applications/Services [101] deployed by the user, as output from the Application/Service Library and Package Requirement Determination [201], as well as determine the library and corresponding package requirements based on any User Specification Interface [102] content interfaced with by the user, as output from the User Specification Application/Service Library and Package Requirement Determination [208], combined with the assistance of the Library and Package Repository [200]. Containerization [215] steps include:

a) Determine Most Fitting Compatible Operating System in Library and Package Repository [216], which involves determining the most optimal operating system fit for the deployed Applications/Services [101]. For example, the Determine Most Fitting Compatible Operating System in Library and Package Repository [216] step may search through the permutations of All Available Share Libraries and Packages [204] and Library Package Dependencies and Sub-Dependencies from User Specification [210] for every available operating system, to determine which operating system types and versions would support each deployed Application/Service [101]. If multiple operating systems support the deployed Application/Service [101] in this way, the latest or most stable type and version may be selected as the optimal choice. The user may also specify, for example through the User Specification Interface [102], a preference for specific operating system types and versions.

b) Gather All Required Libraries and Packages from Library and Package Repository [217], which involves gathering all the required libraries and packages from the Library and Package Repository [200]. These libraries and packages, required for the deployment of the Application/Service [101], correspond to the selected operating system determined by the Determine Most Fitting Compatible Operating System in Library and Package Repository [216] step.

c) Merge Required Libraries and Packages with Application/Service [218], which involves combining the libraries and packages required for the Application/Service [201] deployment, which were gathered in the previous step, with the Application/Service [201], merging everything that is required for the Application/Service [201] deployment.

d) Containerize Resulting Application/Service, Libraries, and Packages Using Minimal Container Image from Container Base Image Repository [219], which involves containerizing the resulting merge from the Merge Required Libraries and Packages with Application/Service [218] step. A minimal container image, which sometimes may be referred to as a "scratch" container, may be used for this. The minimal container image is a minimized version of a container base image that is may act as a minimal starting point for building containers, and can be pulled from the Container Base Image Repository [220].

The resulting container image from Containerization [215], encapsulating the deployed Application/Service [101] and all the required libraries and packages, may then be deployed to the Orchestrator [119], which then deploys it to various Server [120] resources.

Referring to FIG. 3, an exemplary embodiment of the Library and Package Repository [200], depicting the Example Repository Lists of Libraries and Packages for Various Example Operating Systems [300] concept is illustrated and include the following elements.

FIG. 3 depicts the Example Repository Lists of Libraries and Packages for Various Example Operating Systems [300].

Some example operating systems are depicted as [301], specifically Ubuntu α [301], Ubuntu β [301], and CentOS γ [301], which, for the purposes of this example, are different types and versions of Linux.

FIG. 3 also depicts the Example Repository List of All Available Libraries and Packages, for Each Operating System [302], which comprises All Available Libraries and Packages [204], Shared Libraries [206], and Packages [207], for each operating system.

FIG. 3 also depicts the Example Repository List of All Library and Package Dependencies and Sub-Dependencies from User Specifications, for Each Operating System [303], which comprises All Library and Package Dependencies and Sub-Dependencies from User Specification [210], SSH (Secure Shell) Support [212], Libraries [213], and Packages [214], for each operating system.

Implementations of the system described herein can include a plurality of software processing modules stored in a memory and executed on a processor. By way of illustration, the program modules can be in the form of one or more suitable programming languages, which are converted to machine language or object code to allow the processor or processors to execute the instructions. The software can be in the form of one or more standalone applications implemented in a suitable programming language or framework.

Communication among devices (e.g., between a deployment package provider and a device on which the package is deployed) can take place over media such as standard telephone lines, LAN or WAN links (e.g., T1, T3, 56 kb, X.25), broadband connections (ISDN, Frame Relay, ATM), wireless links (802.11 (Wi-Fi), Bluetooth, GSM, CDMA, etc.), for example. The network can carry TCP/IP protocol communications, and HTTP/HTTPS requests made by a web browser, and the connection between the user devices and servers can be communicated over such TCP/IP networks.

Method steps of the techniques described herein can be performed by one or more programmable processors executing one or more computer programs to perform functions by operating on input data and generating output. Method steps can also be performed by, and the modules can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors. Generally, a processor will receive instructions and data from a read-only memory or a random access memory or both. The essential elements of a computer are a processor for executing instructions and one or more memory devices for storing instructions and data. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. One or more memories can store instructions that, when executed by a processor, form the modules and other components described herein and perform the functionality associated with the components. The processor and the memory can be supplemented by, or incorporated in special purpose logic circuitry.

It should also be noted that implementations of the systems and methods can be provided as one or more computer-readable programs embodied on or in one or more articles of manufacture, including non-transitory storage mediums. The program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The terms and expressions employed herein are used as terms and expressions of description and not of limitation, and there is no intention, in the use of such terms and expressions, of excluding any equivalents of the features shown and described or portions thereof. In addition, having described certain implementations in the present disclosure, it will be apparent to those of ordinary skill in the art that other implementations incorporating the concepts disclosed herein can be used without departing from the spirit and scope of the invention. The features and functions of the various implementations can be arranged in various combinations and permutations, and all are considered to be within the scope of the disclosed invention. Accordingly, the described implementations are to be considered in all respects as illustrative and not restrictive. The configurations, materials, and dimensions described herein are also intended as illustrative and in no way limiting. Similarly, although physical explanations have been provided for explanatory purposes, there is no intent to be bound by any particular theory or mechanism, or to limit the claims in accordance therewith.

The invention claimed is:

1. A computer-implemented method for creating a condensed container, the method comprising:
    receiving an instruction to create a container, the container including one or more applications and services;
    identifying one or more shared libraries and corresponding packages required for executing the one or more applications and services;
    determining an optimal operating system for the container by:
        receiving a list comprising a plurality of available operating systems, each available operating system comprising a type and a version, wherein the list specifies, for each available operating system, a permutation of shared libraries and packages provided for the available operating system;
        searching through the permutations to identify a subplurality of the available operating systems that support the one or more applications and services; and
        if the subplurality of the available operating systems includes more than one of the available operating systems, selecting one of the subplurality of available operating systems as the optimal operating system based on (i) most recent type and/or version of operating system, (ii) most stable type and/or version of operating system, or (ii) user preference for type and/or version of operating system;
    selecting versions of the shared libraries and the corresponding packages that correspond to the optimal operating system;
    forming a merge of the selected versions of the shared libraries and corresponding packages with the applications and services; and
    creating the container based on the merge.

2. The method of claim 1, further comprising:
    identifying one or more user-selected libraries and corresponding packages based on functionality specified by a user for inclusion in the container;
    selecting versions of the user-selected libraries and corresponding packages that correspond to the optimal operating system; and
    including the selected versions of the user-selected libraries and corresponding packages in the container.

3. The method of claim 1, further comprising providing a user interface allowing the user to select functionality for inclusion in the container.

4. The method of claim 1, wherein creating the container comprises containerizing the merge using a minimized container based image.

5. The method of claim 1, further comprising deploying the container to one or more servers.

6. The method of claim 1, further comprising:
    selecting a deployment package from a plurality of deployment packages to deploy one or more applications and services, wherein the selecting is based on at least one factor associated with the applications and services, specified user content, deployment resources, historical data, licensed software specifications, organization or network security boundaries, or driver or protocol library availability; and
    deploying the one or more applications and services using the selected deployment package.

7. The method of claim 6, wherein a particular factor associated with the applications and services comprises type, size, granularity, duration, estimated execution time, coupling, modularity, or technical fit between each application or service and available deployment packages.

8. The method of claim 6, wherein a particular factor associated with the deployment resources comprises server cluster resource availability or resource utilization metrics.

9. A system for creating a condensed container, the system comprising:
    at least one memory for storing computer-executable instructions; and
    at least one processor for executing the instructions stored on the at least one memory, wherein execution of the instructions programs the at least one processor to perform operations comprising:
        receiving an instruction to create a container, the container including one or more applications and services;

identifying one or more shared libraries and corresponding packages required for executing the one or more applications and services;
determining an optimal operating system for the container by:
  receiving a list comprising a plurality of available operating systems, each available operating system comprising a type and a version, wherein the list specifies, for each available operating system, a permutation of shared libraries and packages provided for the available operating system;
  searching through the permutations to identify a subplurality of the available operating systems that support the one or more applications and services; and
  if the subplurality of the available operating systems includes more than one of the available operating systems, selecting one of the subplurality of available operating systems as the optimal operating system based on (i) most recent type and/or version of operating system, (ii) most stable type and/or version of operating system, or (ii) user preference for type and/or version of operating system;
selecting versions of the shared libraries and the corresponding packages that correspond to the optimal operating system;
forming a merge of the selected versions of the shared libraries and corresponding packages with the applications and services; and
creating the container based on the merge.

10. The system of claim 9, wherein the operations further comprise:
identifying one or more user-selected libraries and corresponding packages based on functionality specified by a user for inclusion in the container;
selecting versions of the user-selected libraries and corresponding packages that correspond to the optimal operating system; and
including the selected versions of the user-selected libraries and corresponding packages in the container.

11. The system of claim 9, wherein the operations further comprise providing a user interface allowing the user to select functionality for inclusion in the container.

12. The system of claim 9, wherein creating the container comprises containerizing the merge using a minimized container based image.

13. The system of claim 9, wherein the operations further comprise deploying the container to one or more servers.

14. The system of claim 9, wherein the operations further comprise:
selecting a deployment package from a plurality of deployment packages to deploy one or more applications and services, wherein the selecting is based on at least one factor associated with the applications and services, specified user content, deployment resources, historical data, licensed software specifications, organization or network security boundaries, or driver or protocol library availability; and
deploying the one or more applications and services using the selected deployment package.

15. The system of claim 14, wherein a particular factor associated with the applications and services comprises type, size, granularity, duration, estimated execution time, coupling, modularity, or technical fit between each application or service and available deployment packages.

16. The system of claim 14, wherein a particular factor associated with the deployment resources comprises server cluster resource availability or resource utilization metrics.

* * * * *